(12) United States Patent
Lee

(10) Patent No.: US 7,627,945 B2
(45) Date of Patent: Dec. 8, 2009

(54) DOOR INSTALLATION SYSTEM HAVING SYNCHRONOUS MOVEMENT FUNCTION

(75) Inventor: Jae-Won Lee, Ulsan (KR)

(73) Assignee: Hyundai Motor Company, Seoul (KR)

( * ) Notice: Subject to any disclaimer, the term of this patent is extended or adjusted under 35 U.S.C. 154(b) by 757 days.

(21) Appl. No.: 11/302,178

(22) Filed: Dec. 12, 2005

(65) Prior Publication Data

US 2007/0079503 A1 Apr. 12, 2007

(30) Foreign Application Priority Data

Oct. 6, 2005 (KR) .................. 10-2005-0093763

(51) Int. Cl.
*B23P 21/00* (2006.01)

(52) U.S. Cl. .................. 29/787; 198/315; 198/330; 198/349.1; 198/377.01; 29/709; 29/771; 29/791

(58) Field of Classification Search .................. 29/823, 29/721, 281.1, 281.4, 559, 407.09, 282, 787, 29/709, 771, 791; 198/315, 330, 349.1, 370.04, 198/377.01; 104/53, 67
See application file for complete search history.

(56) References Cited

U.S. PATENT DOCUMENTS

| 4,589,184 | A | * | 5/1986 | Asano et al. .................. 29/430 |
| 5,150,506 | A | | 9/1992 | Kotake et al. |
| 5,207,309 | A | * | 5/1993 | Simpkin et al. ........ 198/341.09 |
| 6,226,848 | B1 | * | 5/2001 | Kurtz ...................... 29/407.01 |
| 6,643,905 | B2 | * | 11/2003 | Rhoads et al. ........... 29/407.09 |

FOREIGN PATENT DOCUMENTS

| DE | 3516284 | 6/1986 |
| DE | 4040536 A1 | 12/1990 |
| JP | 03-249008 | 11/1991 |
| JP | 06-080228 | 3/1994 |
| JP | 2000-288848 | 10/2000 |
| JP | 2000-354917 | 12/2000 |

* cited by examiner

*Primary Examiner*—David P Bryant
*Assistant Examiner*—Bayan Salone
(74) *Attorney, Agent, or Firm*—Morgan, Lewis & Bockius LLP

(57) ABSTRACT

During assembly of a vehicle door to a vehicle body, a door installation apparatus is mounted to a frame unit, which is movably mounted on a running rail. A synchronous drive unit, controlled by a user via a control panel, includes a drive roller mounted to the frame unit, a roller shift means that selectively contacts the drive roller to the running rail, and a roller drive unit that drives the drive roller such that the frame unit moves along the running rail at a speed equal to that of the vehicle body.

4 Claims, 8 Drawing Sheets

DOOR INSTALLATION SYSTEM HAVING SYNCHRONOUS MOVEMENT FUNCTION

CROSS-REFERENCE TO RELATED APPLICATIONS

The present application is based on, and claims priority from, Korean Application Serial Number 10-2005-0093763, filed on Oct. 6, 2005, the disclosure of which is hereby incorporated by reference herein in its entirety.

FIELD OF THE INVENTION

The present invention relates to a door installation system having synchronous movement functions and, more particularly, to a door installation system having a synchronous movement function such that the speed of a door installation apparatus holding a door is synchronized with that of a vehicle body, which is being moved by a conveyor, during a process of assembling the door with the vehicle body.

BACKGROUND OF THE INVENTION

Generally, in an outfitting line in which doors are assembled with vehicle bodies, the door is carried towards the vehicle body, which is being moved by a conveyor. Thereafter, the approaching door is aligned with the vehicle body. Subsequently, the door is coupled to a door hinge of the vehicle body using a bolt.

In this process, the door must be carried at a speed corresponding to the movement speed of the vehicle body, which is being moved by the conveyor. Simultaneously, the position of the door with respect to the vehicle body must be precisely set.

As such, it is not easy to assemble the door with the vehicle body. To set the precise position of the door with respect to the vehicle body and to conduct the bolt tightening process, highly skilled technique has been required.

Furthermore, because the door is too heavy for one worker to carry, a separate door installation apparatus is required. However, a conventional door installation apparatus has no function of moving at a speed corresponding to the movement speed of the vehicle body, which is being carried by the conveyor. Therefore, the worker must carry the door to the moving vehicle body using the door installation apparatus and couple the door to the vehicle body using a bolt after aligning the door with the door hinge of the vehicle body. During even this process, because the vehicle body is being continuously moved by the conveyor, there has been a problem in that the bolt coupling process is difficult.

SUMMARY OF THE INVENTION

Embodiments of the present invention provide a door installation system having a synchronous movement function such that the speed of a door installation apparatus holding a door is synchronized with that of a vehicle body, which is being moved by a conveyor, during a process of assembling the door with the vehicle body, thus making it possible for a worker to perform the process of assembling the door with the vehicle body more conveniently.

A door installation system according to an embodiment of the present invention carries a door and assembles the door with a vehicle body, which is being moved by a conveyor provided on a support surface of a vehicle assembly line. A running rail is provided above the conveyor in the same orientation as the conveyor. A frame unit is mounted to the running rail so as to be movable along the running rail. A synchronous drive unit is installed in the frame unit so as to synchronize the speed of the frame unit, with respect to the running rail, with the speed at which the conveyor carries the vehicle body. A door installation apparatus is mounted to the frame unit to carry the door to the position at which the door is assembled with the vehicle body. A control panel is provided such that the synchronous drive unit is operated under the control of a user. The synchronous drive unit includes a drive roller which is mounted to the frame unit and is selectively brought into contact with the running rail, a roller shift unit which shifts the drive roller such that the drive roller selectively contacts the frame unit, and a roller drive unit which drives the drive roller such that the frame unit is moved along the running rail.

BRIEF DESCRIPTION OF THE DRAWINGS

For a better understanding of the nature and objects of the present invention, reference should be made to the following detailed description with the accompanying drawings, in which.

DETAILED DESCRIPTION OF THE PREFERRED EMBODIMENTS

Hereinafter, an exemplary embodiment of the present invention will be described in detail with reference to the attached drawings.

A door installation system having a synchronous movement function according to the exemplary embodiment of the present invention is used in an outfitting line of a vehicle assembly process in which doors are assembled with vehicle bodies, having passed through a coating process, by a door installation apparatus.

In detail, as shown in FIGS. 1 through 5, the outfitting line includes a conveyor (not shown) which is provided on a support surface to convey vehicle bodies. A pair of running rails 10, which are suspended from a ceiling (not shown), is provided above the conveyor in the same orientation as the conveyor. A frame unit 14 is mounted to the running rails 10 through a plurality of idle rollers 12 so as to be movable along the running rails 10.

Furthermore, a synchronous drive unit is installed in the frame unit 14 so as to synchronize the movement speed of the frame unit 14, with respect to the running rails 10, with the speed at which the conveyor carries the vehicle body. A door installation apparatus, which carries a door 16 to a position at which the door 16 is mounted to the vehicle body, is provided in the frame unit 14. A control panel (CP) is separately provided such that the synchronous drive unit is operated under the control of a worker.

Figure 1:
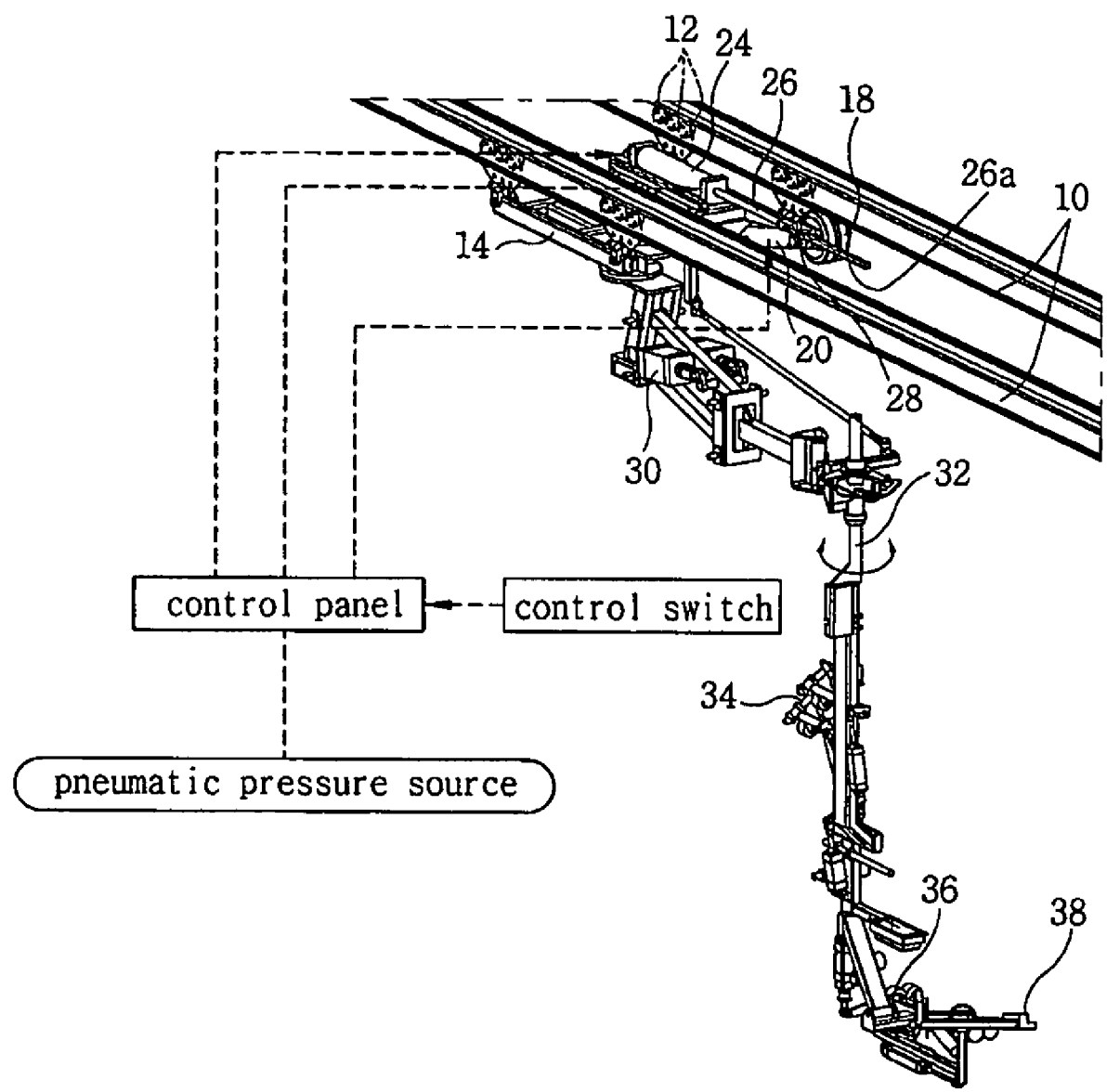
FIG. 1 is a view showing a door installation apparatus of a door installation system having a synchronous movement function, according to an embodiment of the present invention.
Figure 2:
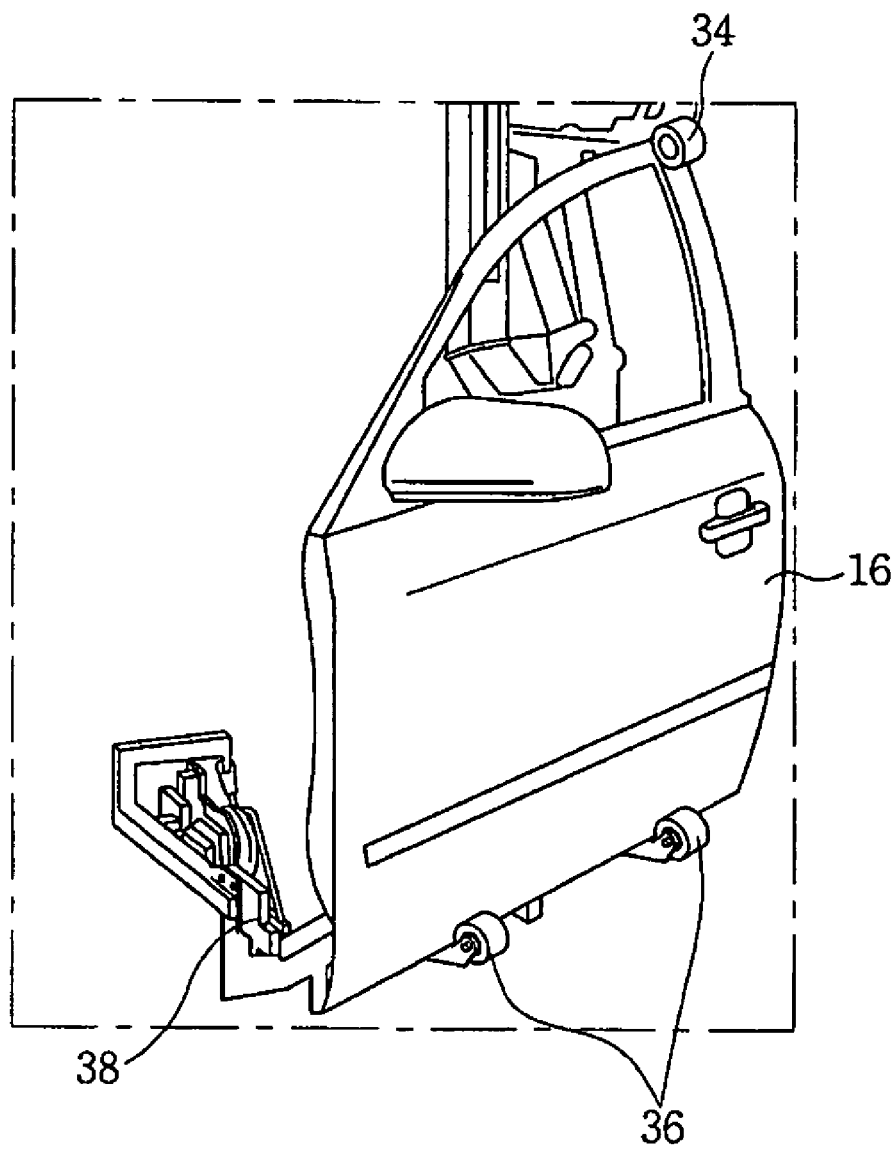
FIG. 2 is a view showing a door held by the door installation apparatus of FIG. 1.
Figure 3:
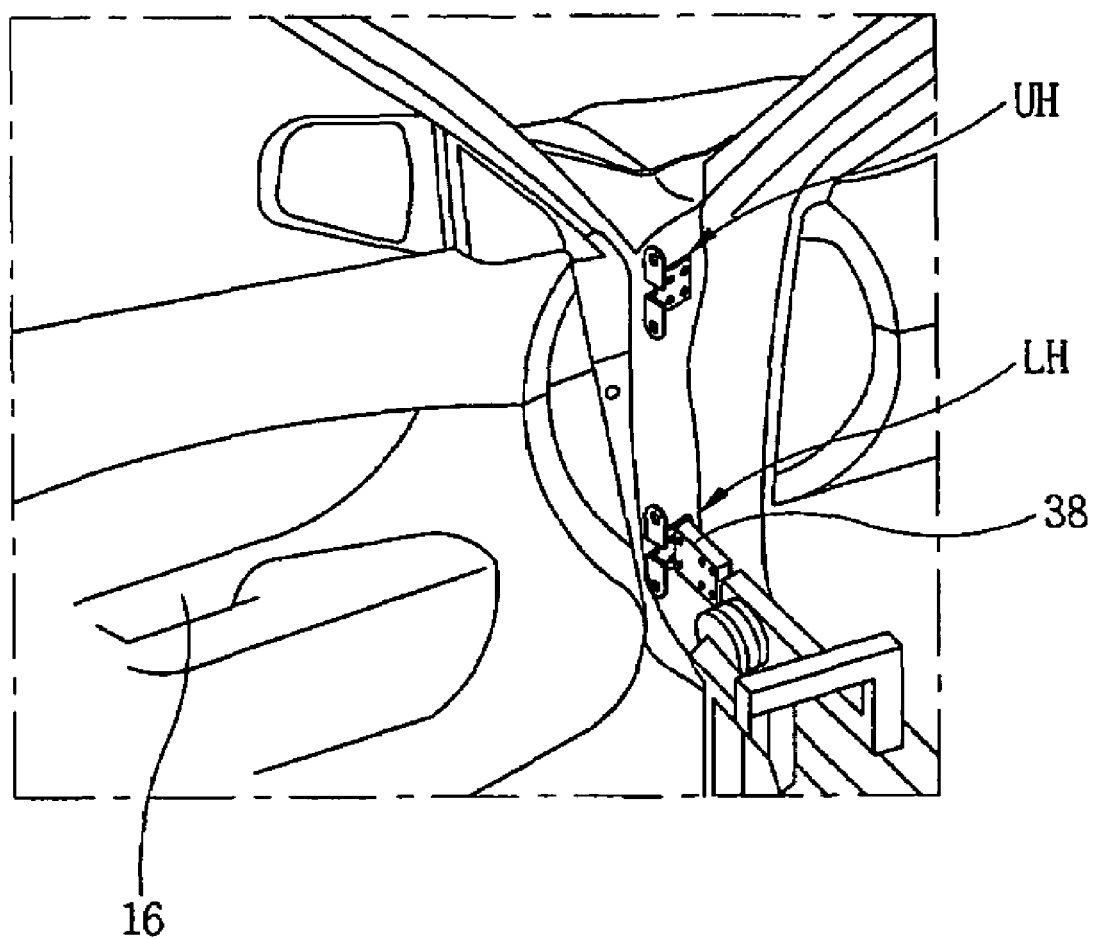
FIG. 3 is a view showing the door of FIG. 2, which is in surface contact with upper and lower hinges of a vehicle.
Figure 4:
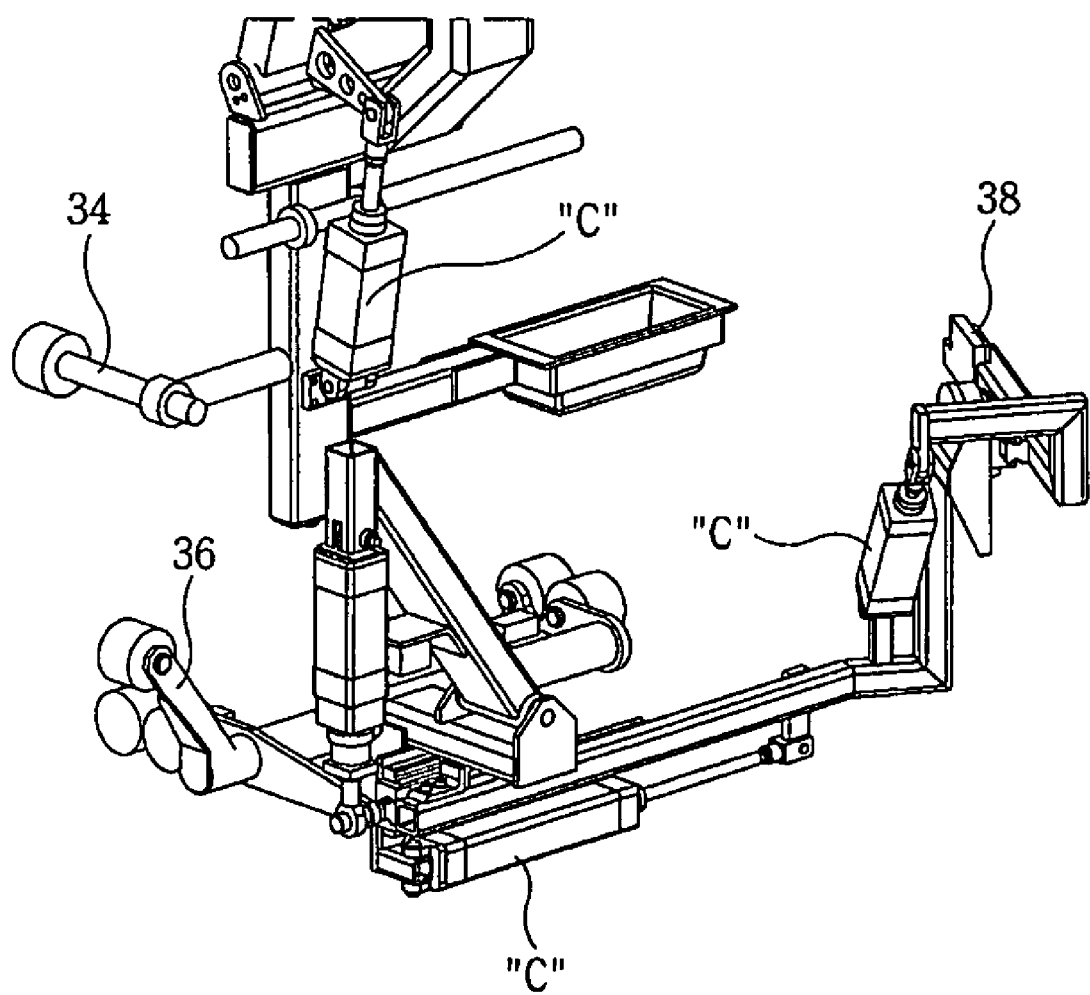
FIG. 4 is a view showing the detailed construction of a lower portion of the door installation apparatus of FIG. 1.
Figure 5:
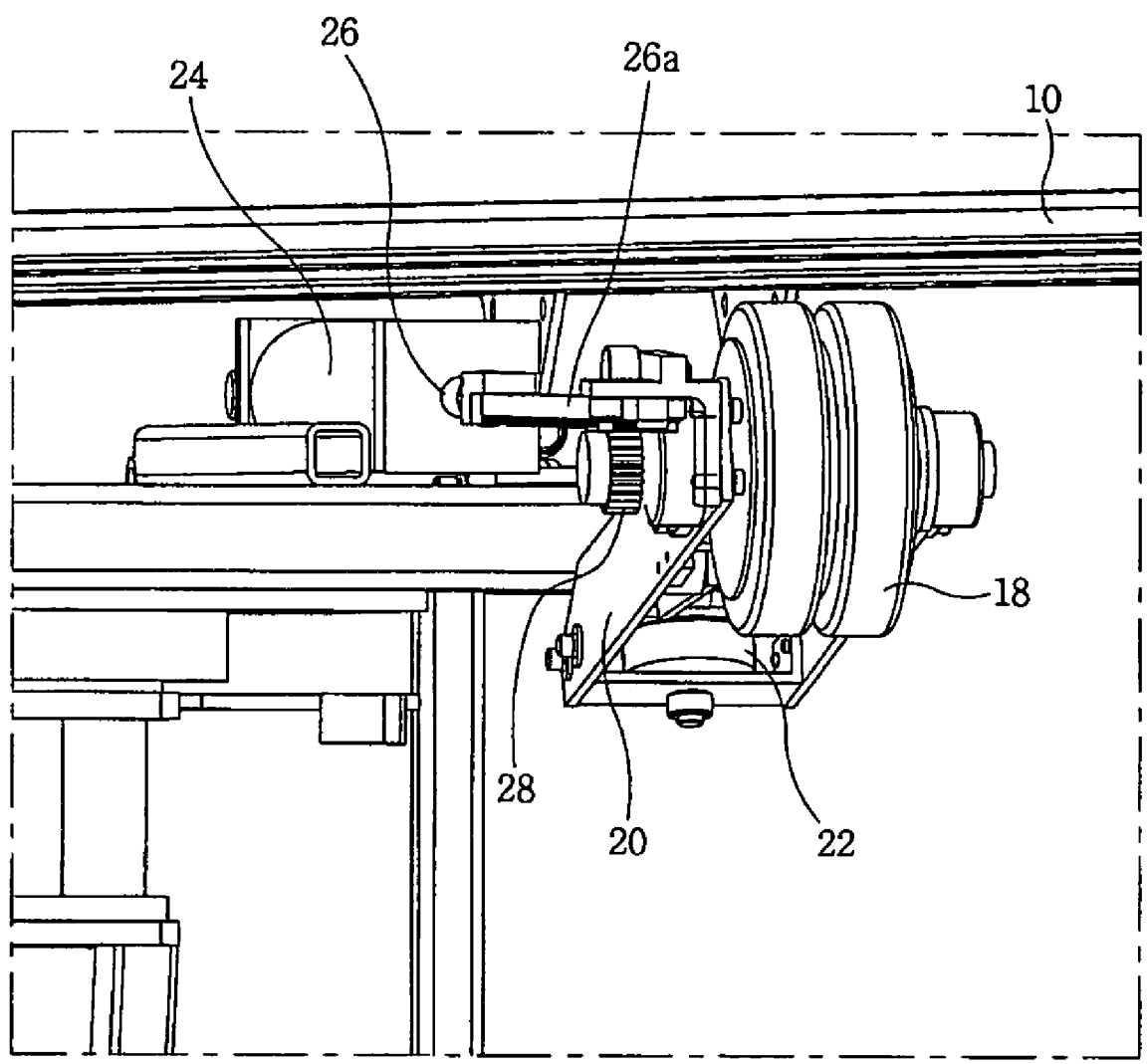
FIG. 5 is a view showing the detailed construction of an upper portion of the door installation apparatus of FIG. 1.

For this, an air sac 22 and a cylinder 24 are connected to a pneumatic pressure source through pneumatic pressure pipe lines (shown by the broken lines in FIG. 1). The application or removal of pneumatic pressure through the pneumatic pressure pipe lines is controlled through the control panel. The controlling operation of the control panel is performed in response to the manipulation of a control switch by a worker.

The synchronous drive unit includes a drive roller 18 which is mounted to the frame unit 14 and is selectively brought into contact with the running rail 10, and a roller shift unit which shifts the drive roller 18 such that the drive roller 18 selectively contacts the frame unit 14. The synchronous drive unit further includes a roller drive unit which drives the drive roller 18 such that the frame unit 14 is moved along the running rail 10, thus synchronizing the movement speed of the frame unit 14 with the movement speed of the conveyor.

The roller shift unit includes a support rod 20 which is coupled to the frame unit 14 by a hinge. The drive roller 18 is mounted to a first rotating end of the support rod 20. The roller shift unit further includes the air sac 22 which is mounted to a second rotating end of the support rod 20 and is expanded and contracted by pneumatic pressure supplied from the outside.

Furthermore, the roller drive unit includes the cylinder 24 which is mounted to the frame unit 14 and has a piston rod 26 that is linearly advanced and retracted along the running rail 10 by pneumatic pressure supplied from the outside. The roller drive unit further includes a rack gear 26a which is coupled to the piston rod 26, and a pinion 28 which has the same axis as the driver roller 18 and rotates while engaging with the rack gear 26a.

Meanwhile, the door installation apparatus includes a lift cylinder 30 which is provided under the frame unit 14 to control the upward and downward movement of the door 16, a rotating shaft 32 which is provided so as to be rotatable downwards with respect to the lift cylinder 30, and an upper clamp unit 34 which is mounted to the rotating shaft 32 and supports an upper portion of the door 16. The door installation apparatus further includes a lower attaching unit 36 which is mounted to the rotating shaft 32 and supports a lower portion of the door 16, and a synchronous arm 38 which is mounted to the lower attaching unit 36 and is brought into surface contact with a lower hinge (LH) of the vehicle body.

Furthermore, a plurality of cylinders (C) is provided in the door installation apparatus so as to operate the upper clamp unit 34, the lower attaching unit 36 and the synchronous arm 38.

In this embodiment, during a process of assembling the door 16 to the vehicle body in the outfitting line, when the movement speed of the frame unit 14, which moves along the running rails 10, is synchronized with the conveying speed of the vehicle body, which is being moved by the conveyor, by the operation of the synchronous drive unit, the synchronous arm 38 is brought into surface contact with the lower hinge (LH) of the vehicle body, such that bolt coupling positions of the door 16 are precisely aligned with bolt coupling positions of both an upper hinge (UH) and the lower hinge (LH) of the vehicle body, thus making it possible for the worker to perform a bolt coupling process more easily.

That is, to assemble the door 16 to the vehicle body, which is being moved by the conveyor, in the outfitting line, the door 16 is securely supported by the upper clamp unit 34 and the lower attaching unit 36 of the door installation apparatus and, thereafter, the synchronous arm 38 is brought into surface contact with the lower hinge (LH) of the vehicle body by rotating the door 16 using the rotating shaft 32. Then, the bolt coupling positions of the door 16 are aligned with the upper hinge (UH) and the lower hinge (LH) of the vehicle body.

Figure 6:
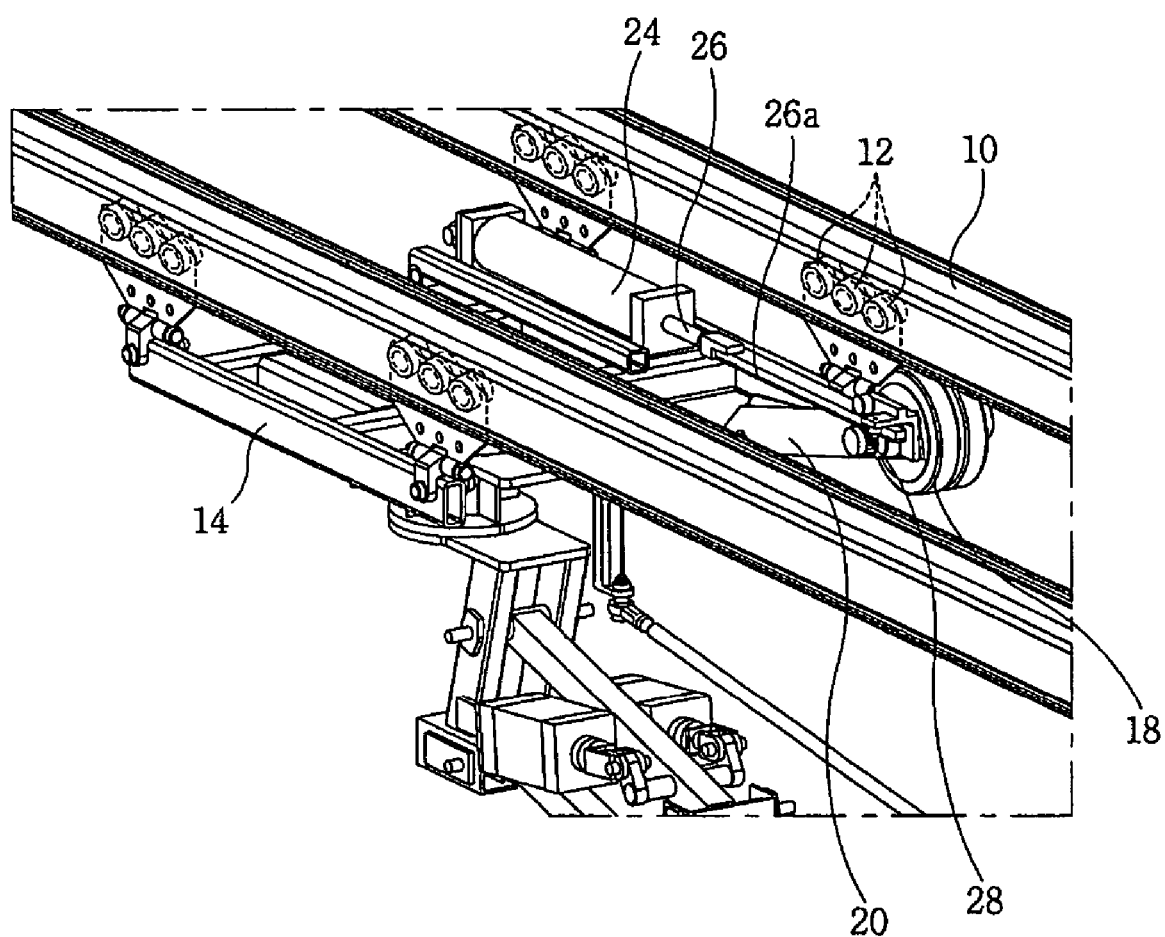
FIGS. 6 through 8 are views showing the operation of the door installation system according to the present invention.
Figure 7:
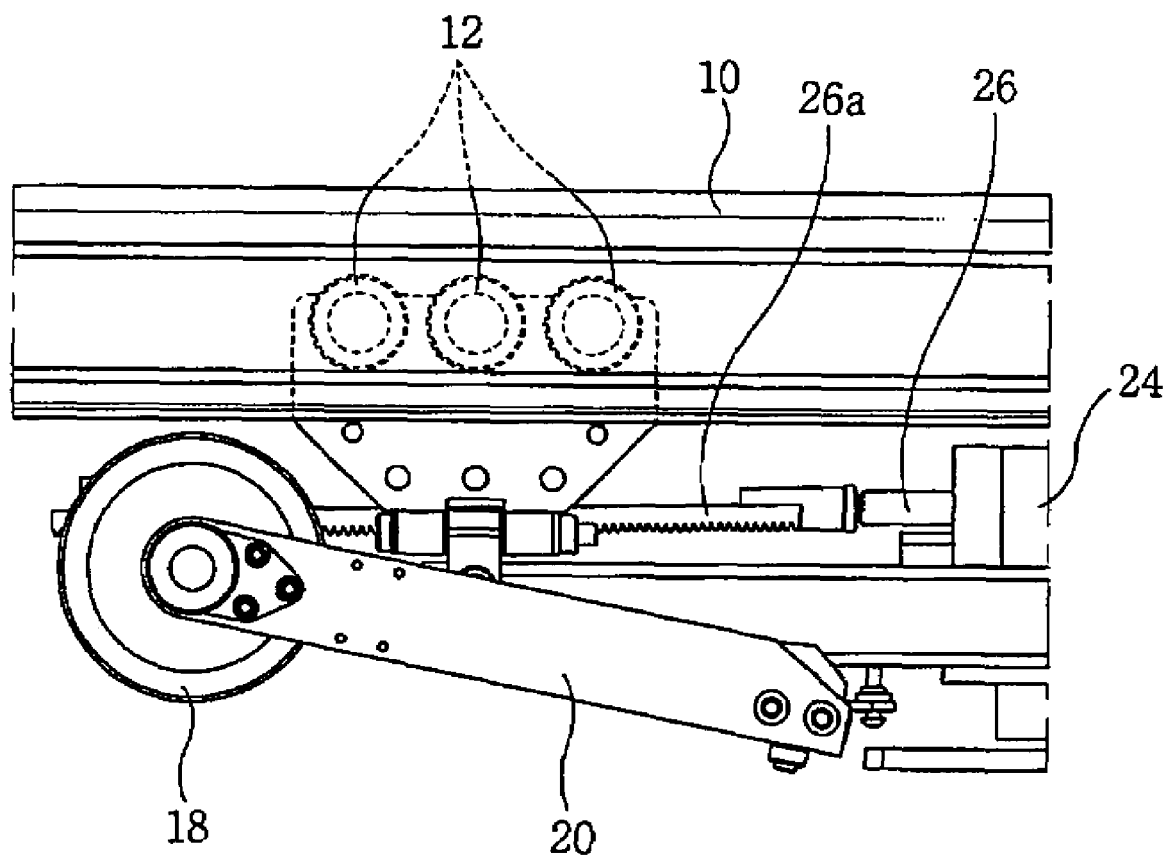

Thereafter, when the worker manipulates the control switch, the control panel applies pneumatic pressure from the pneumatic pressure source to the air sac 22 and the cylinder 24. First, when pneumatic pressure is applied to the air sac 22, as shown in FIGS. 6 and 7, an end of the support rod 20 is rotated upwards so that the drive roller 18 is brought into contact with a lower surface of the running rail 10.

Figure 8:
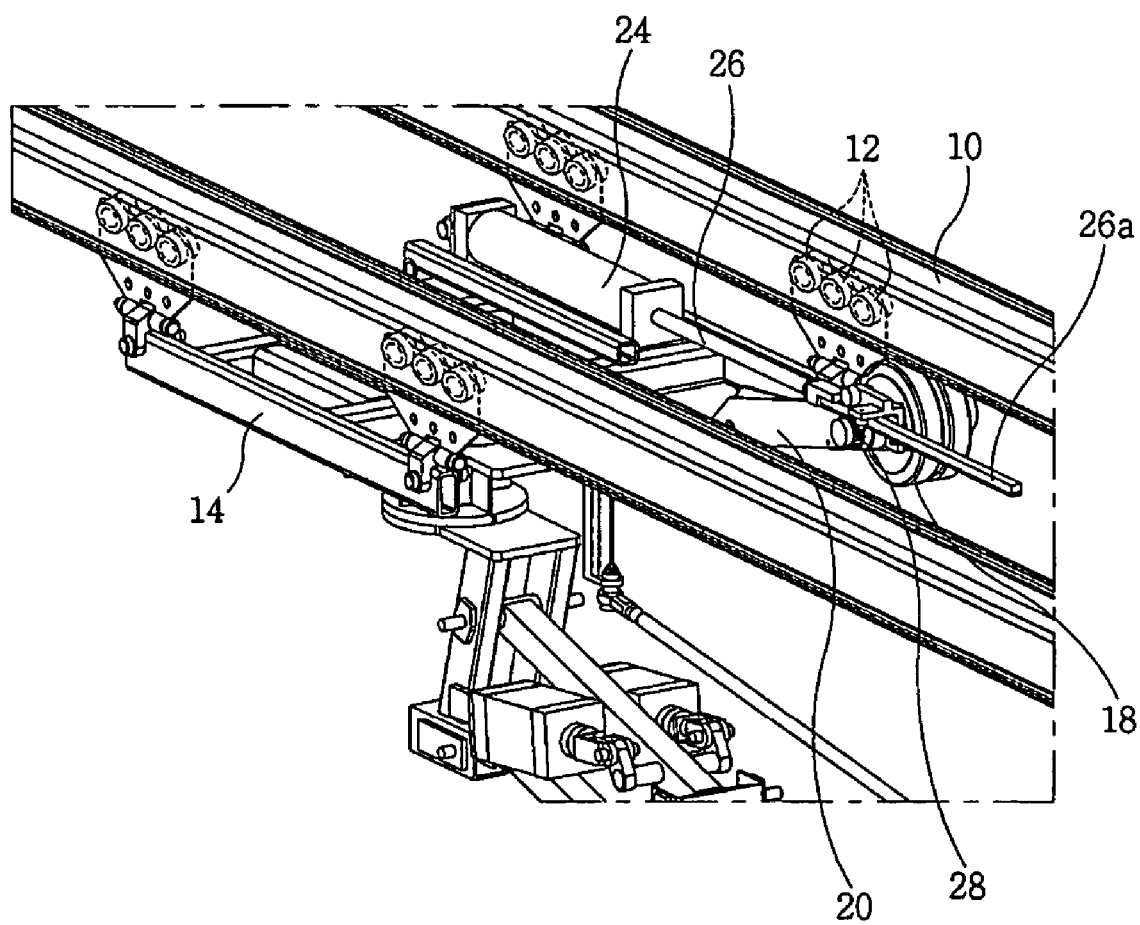

Furthermore, when pneumatic pressure is applied to the cylinder 24, as shown in FIG. 8, the piston rod 26 is advanced so that the rack gear 26a coupled to the piston rod 26 rotates the pinion 28. Then, the drive roller 18, which has the same axis as the pinion 28, is rotated by the rotation of the pinion 28 while in close contact with the running rail 10. Thus, the frame unit 14 is moved along the running rails 10.

As a result, the door installation apparatus provided under the frame unit 14 is moved at the same speed as the vehicle body which is being moved by the conveyor.

At this time, the worker couples the door 16 to one of the upper hinge (UH) or the lower hinge (LH) of the vehicle body using a bolt, thus preliminarily coupling the door 16 to the vehicle body. Thereafter, the upper clamp unit 34 and the lower attaching unit 36 are removed from the door 16, so that the door 16 is separated from the door installation apparatus.

Subsequently, when the worker manipulates the control switch to remove the pneumatic pressure, the pneumatic pressure, which has been applied to the air sac 22, is removed from the air sac 22. Then, the drive roller 18 descends due to its weight and is thus moved away from the running rail 10. Furthermore, the cylinder 24 is returned to its original state. Thus, the position of the frame unit 14 with respect to the running rail 10 is returned to the initial state thereof, such that the door installation apparatus prepares for the installation of another door 16 on a subsequent vehicle body.

Thereafter, the worker completes the bolt coupling process of the upper hinge (UH) and the lower hinge (LH), thus completely assembling the door 16, which has been preliminarily coupled to the vehicle body, with the vehicle body.

In this case, of course the speed of the piston rod 26, which is linearly advanced from the cylinder 24 by the pneumatic pressure supplied to the cylinder 24, should be set such that the movement speed of the frame unit 14 is the same as the conveying speed of the conveyor that moves the vehicle body.

As well, in the above-mentioned door installation process, when the door installation apparatus moves at the same speed as that of the vehicle body which is being moved by the conveyor, the synchronous arm 38 of the door installation apparatus is in the state of pressing the lower hinge (LH). Thereby, in the outfitting line, in which the door 16 is assembled with the vehicle body, the synchronous arm 38 synchronizes the movement speed of the door installation apparatus, which moves along the running rails 10, with the movement speed of the vehicle which is being moved by the conveyor, thus making it possible for the worker to easily perform the process of tightening the bolt into the upper hinge (UH) or the lower hinge (LH) of the vehicle body to preliminarily assemble the door 16 to the vehicle body.

As is apparent from the foregoing, a door installation system of the present invention is able to synchronize movement speed of a door installation apparatus, holding a door, with movement speed of a vehicle body during a process of carrying and assembling the door to the vehicle body, which is being moved by a conveyor, in an outfitting line, thus making it possible for a worker to assemble the door with the vehicle body more conveniently.

What is claimed is:

1. A door installation system to carry a door and assemble the door with a vehicle body, which is being moved by a conveyor provided on a support surface of a vehicle body assembly line, comprising:
- a running rail provided above the conveyor in a same orientation as the conveyor;
- a frame unit mounted to the running rail so as to be movable along the running rail;
- a synchronous drive unit installed in the frame unit for synchronizing speed of the frame unit, with respect to the running rail, with a speed at which the conveyor carries the vehicle body;
- a door installation apparatus mounted to the frame unit, which carries the door to a position at which the door is assembled with the vehicle body; and
- a control panel provided such that the synchronous drive unit is operated under control of a user;
- wherein the synchronous drive unit comprises:
- a drive roller mounted to the frame unit and selectively brought into contact with the running rail;
- a roller shift unit, for shifting the drive roller such that the drive roller selectively contacts the frame unit and
- a roller drive unit, for driving the drive roller such that the frame unit is moved along the running rail.

2. The door installation system as defined in claim 1, wherein the roller shift unit comprises:
- a support rod coupled to the frame unit by a hinge, with the drive roller mounted to a first rotating end of the support rod; and
- an air bellows mounted to a second rotating end of the support rod and expanded and contracted by pneumatic pressure.

3. The door installation system as defined in claim 2, wherein the roller drive unit comprises:
- a cylinder mounted to the frame unit and having a piston rod that is linearly advanced and retracted along the running rail by pneumatic pressure supplied from outside;
- a rack gear coupled to the piston rod; and
- a pinion having a same axis as the driver roller and rotating while engaging with the rack gear.

4. The door installation system as defined in claim 1, wherein the door installation apparatus comprises:
- a lift cylinder provided under the frame unit, which controls upward and downward movement of the door;
- a rotating shaft that is downwardly rotatable with respect to the lift cylinder;
- an upper clamp unit mounted to the rotating shaft, which supports an upper portion of the door;
- a lower attaching unit mounted to the rotating shaft, which supports a lower portion of the door; and
- a synchronous arm mounted to the lower attaching unit and brought into surface contact with a lower hinge of the vehicle body.

* * * * *